Dec. 22, 1970 H. F. PAUL 3,550,012

SQUELCH SYSTEM

Filed Sept. 10, 1968 2 Sheets-Sheet 1

HARRY F. PAUL
INVENTOR.

BY Nicholas A. Pandiscio

ATTORNEY.

SQUELCH SYSTEM

Filed Sept. 10, 1968 2 Sheets-Sheet 2

HARRY F. PAUL
INVENTOR.

BY
Nicholas A. Pandiscio
ATTORNEY.

United States Patent Office 3,550,012

Patented Dec. 22, 1970

3,550,012

SQUELCH SYSTEM

Harry F. Paul, Belmont, N.H., assignor to Tram Corporation, Winnisquam, N.H., a corporation of New Hampshire Filed Sept. 10, 1968, Ser. No. 758,730
Int. Cl. H04b *1/10*
U.S. Cl. 325—478 7 Claims

ABSTRACT OF THE DISCLOSURE

An improved noise eliminating circuit which prevents delivery of received signals to the audio stage of a radio receiver for the duration of a received noise signal exceeding a predetermined detectable magnitude. The noise eliminating circuit comprises a push-pull shunt and series arrangement of current control devices which are effective to block passage of intelligence signals from one to the other of two selected stages in response to control signals derived from noise signals received simultaneously with the intelligence-bearing signals.

This invention relates to radio receivers and more particularly to an improved noise eliminating circuit.

In the operation of radio receivers noise impulses caused by atmospheric disturbances or generated by other electrically controlled or powered apparatus may reach a level as to prevent satisfactory reproduction of a received intelligence bearing signal. Accordingly a number of different types of circuits have been devised for silencing, i.e., blanking or opening, receivers during the duration of noise signals. See for example, U.S. Pats. 2,160,073, 2,172,922, 2,101,549, 3,056,087 and 3,366,884. However, these prior art circuits suffer from certain disadvantages and limitations, including high cost, relatively slow response so that the receiver is blanked too late to effectively prevent reproduction of noise signals or is blanked for a substantial period after the noise signals have passed, the need to sample the noise from a frequency spectrum lying outside of the frequency bandwidth of the intelligence bearing signals, and a tendency to generate noise in blanking and unblanking the receiver.

Accordingly the primary object of this invention is improvement of noise silencing circuits generally and more specifically to provide a noise silencing circuit for radio receivers which substantially eliminates or reduces the frequency limitations of the prior art.

A further object of this invention is to provide a silencing circuit which prevents delivery of received signals to the audio stages of a receiver for the duration of a received noise signal when it reaches a predetermined detectable magnitude and to provide intelligence signal circuits which are switched fast enough to prevent desensitizing the receiver or causing distortion.

In accordance with the invention there is provided between two selected stages of a receiver a first noise silencing circuit comprising a push-pull shunt and series arrangement of solid state current control devices effective to block passage of intelligence signals from one to the other of the two stages in response to application of control signals, and a second circuit for producing the aforementioned control signals in response to noise signals occurring simultaneously with the received intelligence bearing signals. The noise silencing circuit comprises an input transformer having a primary winding coupled to the output of a convenient stage of the receiver and having a center-tapped secondary winding coupled to a succeeding stage by a pair of transistors connected in a push-pull arrangement. The transistors are connected by a pair of diodes connected back to back. Control signals derived from noise pulses produced by the aforementioned second circuit are applied to similar electrodes of the two diodes to bias them into conduction, thereby shorting or clamping corresponding terminals of the two transistors so that the latter are rendered ineffective to pass the noise pulses through to the aforementioned succeeding stage.

Other aspects and many of the attendant advantages of the invention are set forth in the following detailed description which is to be considered together with the accompanying drawings wherein.

In these drawings, the same components are identfied by the same reference numerals.

Figure 1:
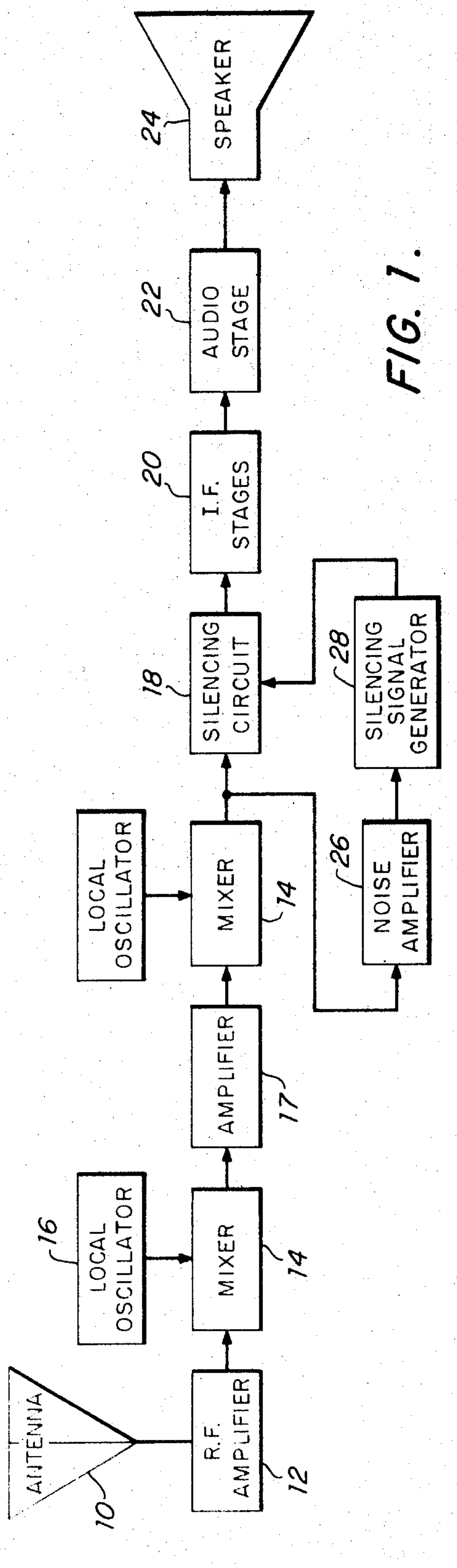
FIG. 1 is a block diagram of a radio receiver embodying a noise eliminating circuit.

Referring now to FIG. 1, incoming intelligence bearing RF signals are received by a suitable antenna 10 and supplied to an RF amplifier 12. The output of amplifier 12 is then passed through one or more heterodyning stages each comprising a mixer 14 and a local oscillator 16. Successive mixers 14 may be coupled by an amplifier 17. In each heterodyning stage the mixer 14 and oscillator 16 cooperate in the usual manner to produce a lower I.F. frequency. The output of the one or more heterodyning stages is supplied to two channels. In one channel the output is fed via a silencing circuit 18 through one or more conventional I.F. stages 20 for filtering and/or amplifying, and then through a conventional audio stage 22 adapted to detect and amplify the intelligence audio signals. The latter in turn are fed to a speaker 24 where they are converted to an audible output. In the second channel the output from theh mixer put. In the second channel the output from the mixer 14 immediately preceding silencing circuit 18 is fed to a noise amplifier 26 where both intelligence and noise signals are amplified. The output of noise amplifier 26 is then fed to a silencing signal generator 28 which is adapted to detect amplified noise signals and, in response thereto, produce silencing signals. The latter are fed back to the silencing circuit which is adapted to short circuit the normal signal path leading to the I.F. stages 20 and and to keep it shorted for the duration of the noise producing the silencing signals. The second channel is designed to be substantially free of delay relative to the first channel so as to enable the silencing circuit to cut off the intelligence signal path coincident with and for the duration of the detected noise.

Figure 2:
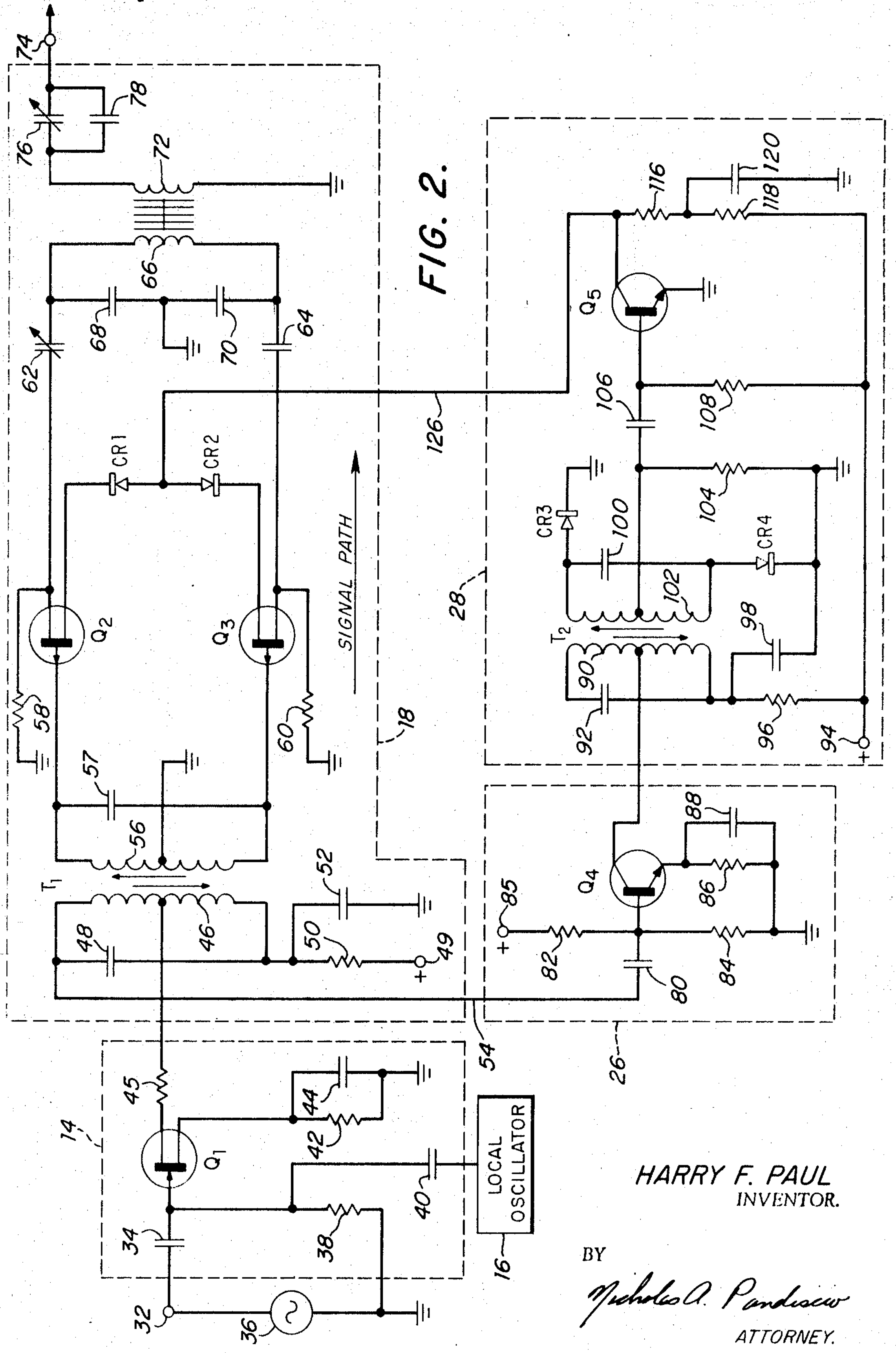
FIG. 2 is a circuit diagram of a preferred embodiment of the invention.

Turning now to FIG. 2, the illustrated embodiment includes a preferred design for the mixer 14 immediately preceding the silencing circuit as well as preferred designs for silencing circuit 18, noise amplifier 26 and the silencing signal generator 28. Mixer 14 comprises an FET transistor $Q_1$ (which preferably but not necessarily is of type 2N3819) having its gate electrode connected to an input terminal 32 via a blocking capacitor 34. The input signal from transistor $Q_1$, represented at 36, is applied between ground and input terminal 32. The gate of $Q_1$ also is connected to ground through an appropriate value dropping resistor 38. The output of local oscillator 16 is applied to the gate of $Q_1$ through a blocking capacitor 40. Oscillator 16 has a frequency which when heterodyned with the high frequency intelligence bearing input signal 36 will yield a suitable lower I.F. frequency, typically a frequency of 455 $kH_z$. The source electrode of transistor $Q_1$ is connected to ground via a biasing resistor 42 and a bypass capacitor 44. Capacitor 44 provides a low impedance path for A.C. current around resistor 42 so as to render the D.C. bias on the source insensitive to the A.C. current. The drain electrode of $Q_1$ is connected via a resistor 45 to the center tap on the primary coil 46 of a transformer $T_1$ which forms part of the input end of silencing circuit 18. A capacitor 48 is connected across primary coil 46 and one end of the latter is connected to a suitable positive D.C. voltage source 49 via a resistor 50. The same end of coil 46 is connected to ground via a capacitor 52. Capacitor 48 serves to tune coil 46 to the output frequency of mixer 14 and capacitor 52 provides a low A.C. impedance path to ground for the cold end of the primary of $T_1$ and serves as an RF filter in conjunction with resistor 50. The opposite end of coil 46 is connected to noise amplifier 26 via a lead 54.

The secondary coil 56 of transformer $T_1$ has a center tap connected to ground and a tuning capacitor 57 connected across its terminals. Silencing circuit 18 also includes two PNP field effect transistors $Q_2$ and $Q_3$ which preferably but not necessarily are of type T1XM12. The ends of secondary coil 56 are connected directly to the gate electrodes of transistors $Q_2$ and $Q_3$. The drain electrodes of these same transistors are connected to each other via two diodes CR1 and CR2. The latter (which may be type 1N3064) are connected back to back with their cathodes connected to drain electrodes of transistors $Q_2$ and $Q_3$. The source electrodes of $Q_2$ and $Q_3$ are connected to ground through identical dropping resistors 58 and 60 respectively and are also connected via capacitors 62 and 64 respectively to the opposite ends of the input coil 66 of a mechanical band-pass filter F. By way of illustration but not limitation, the filter F may be of a type F455C60 unit produced by Collins Radio Company of Cedar Rapids, Iowa. The filter is designed to eliminate signals falling outside of the selected I.F. frequency. One or both of capacitors 62 and 64 may be of the variable type in order to facilitate proper tuning. An additional pair of tuning capacitors 68 and 70 of equal value are connected across coil 66. The junction of capacitors 68 and 70 is grounded.

The output coil 72 of filter F has one terminal connected to ground and the other terminal connected to an output terminal 74 via a pair of parallel connected capacitors 76 and 78 respectively. One or both of capacitors 76 and 78 may be variable as required. Output terminal 74 serves to couple the output of silencing circuit 20 to I.F. stages 20.

Figure 3:
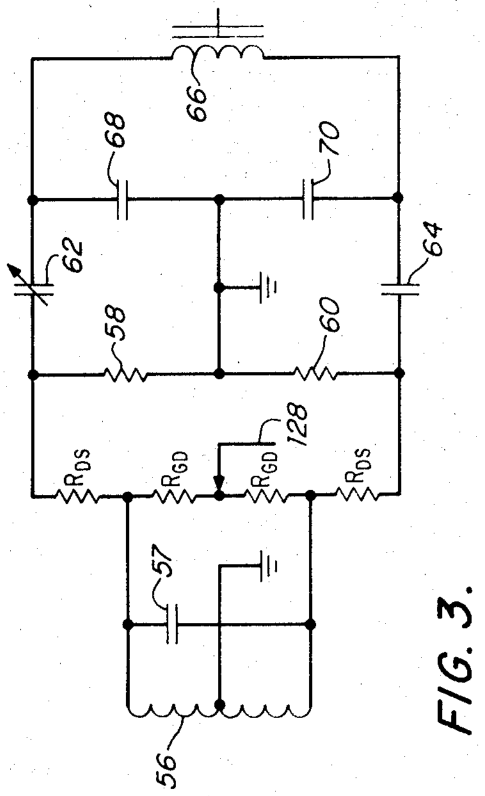
FIG. 3 is an equivalent circuit demonstrating how the noise circuit is affected by application of control signals.

At this point it is to be appreciated that the above described silencing circuit illustrated in FIG. 3 involves both a shunt and series type arrangement. It is a shunt arrangement because the two diodes CR1 and CR2 are connected between the drains of transistors $Q_2$ and $Q_3$; it is a series arrangement since transistors $Q_2$ and $Q_3$ operate in push-pull between transformer $T_1$ and filter F with the intelligence signals passing through the gate-source junction of the two transistors. In essence the transistors $Q_2$ and $Q_3$ act as diodes with respect to their gate-source junctions and in the absence of noise derived control signals, the diodes CR1 and CR2 remain non-conductive, there is little or no current flow in the drain-source circuits, and the applied intelligence-bearing signals pass unattenuated through the gate-source diodes of transistors $Q_2$ and $Q_3$ to filter F. However, if the drains of $Q_2$ and $Q_3$ are effectively clamped or shorted together to an appropriate voltage level by conduction of diodes CR1 and CR2, the two transistors will be prevented, in a manner hereinafter described in further detail, from passing any substantial portion of the applied signals to the filter F.

The noise amplifier 26 shown in FIG. 2 comprises an NPN transistor $Q_4$ (which may be of any convenient type, e.g., 2N3904) connected in the common emitter mode. The input signals applied to the primary of transformer $T_1$ are fed by lead 54 to the base electrode of transistor $Q_4$ via a coupling capacitor 80. The base electrode of $Q_4$ also is connected to the junction of two resistors 82 and 84 which together form a voltage divider network connected between a positive D.C. voltage source 85 and ground. The emitter of $Q_4$ is connected to ground via a resistor 86 of appropriate value. A by-pass capacitor 88 is connected across resistor 86. Capacitor 88 serves the same function as capacitor 44. The capacitors and resistors connected to $Q_4$ are selected so as to provide time constants which favor amplification of noise signals which have a faster rise time than the intelligence-bearing signals.

The collector of $Q_4$ is connected to a center tap on the primary coil 90 of a transformer $T_2$ which forms the input end of silencing signal generator 28. A capacitor 92 is connected across coil 90. One end of coil 90 also is connected to a positive D.C. voltage source 94 via a dropping resistor 96 and also is connected to ground via a capacitor 98. A capacitor 100 is connected across the secondary coil 102 of transformer $T_2$. Capacitors 92 and 100 serve to tune the transformer $T_2$ to provide maximum amplitude of the noise pulses appearing across resistor 104 referred to hereinafter. Additionally the opposite ends of coil 102 are connected to ground via a like pair of diodes CR3 and CR4 which may be of type 1N3064. Diodes CR3 and CR4 are oriented so that their cathodes are connected to ground and function to rectify the signals appearing at the secondary of transformer $T_2$ so as to detect the randomly occurring noise signals.

Coil 102 of transformer $T_2$ has a center tap which is connected to the base of an NPN transistor $Q_5$ via an RC filter comprising a resistor 104 connected between the center tap and ground and a capacitor 106 connected between the center tap and the base of $Q_5$. Capacitor 106 has a small value so it will suppress any audio signals passed by rectifying diodes CR3 and CR4. Capacitor 106 and resistor 104 function to shape the noise pulses passed by the diodes so that they have a relatively steep wavefront. $Q_5$ may be of any suitable type, e.g., type 2N3904, and is connected in the common emitter mode so as to function as a noise pulse amplifier. A resistor 108 is connected between the base and the positive D.C. voltage source 94. Resistor 108 provides forward bias for $Q_5$. The emitter of $Q_5$ is connected to ground. Appropriate collector voltage is established by connecting the collector of $Q_5$ to voltage source 94 via a pair of series resistors 116 and 118 of appropriate value. A capacitor 120 of suitable value is connected between ground and the junction of resistors 116 and 118. Capacitor 120 provides a low impedance path to ground for the pulses and keeps them out of the supply lead.

In the absence of a noise pulse $Q_5$ is saturated and the collector voltage is essentially zero with respect to ground. CR3 and CR4 are connected to provide negative pulses across resistor 104 which are applied to the base of $Q_5$ via capacitor 106. When a negative pulse is present, $Q_5$ collector current is zero or near zero and the collector voltage becomes positive. Positive pulses at the base have no effect since $Q_5$ is saturated in the absence of a negative pulse. The output of pulse amplifier $Q_5$ is connected back to the anodes of diodes CR1 and CR2 via a lead 126. When the collector voltage of $Q_5$ becomes positive, it causes diodes CR1 and CR2 to conduct so as to clamp together the drains of the FET transistors $Q_2$ and $Q_3$. As a result of this clamping action the gate-drain and drain-source resistances become quite low and provide low impedance paths in shunt across the secondary of transformer $T_1$. Accordingly current flows through the resistors 58 and 60, transistors $Q_2$ and $Q_3$, diodes CR1 and CR2 and resistors 128 and 124. These low impedance paths across the secondary have the effect of greatly attenuating the signals passing through the gate-source diodes, with the result that little or no signal input is applied to filter F.

FIG. 3 illustrates the equivalent circuit of silencing circuit 18 when a control signal is applied to diodes CR1 and CR2 via lead 126. The designations $R_{DS}$ and $R_{GD}$ represent the drain-to-source and gate-to-drain resistances of transistors $Q_2$ and $Q_3$. By way of example but not limitation, if transistors $Q_2$ and $Q_3$ and diodes CR1 and CR2 are of the preferred type indicated hereinbefore, and if resistors 58 and 60 each have a value of 10 kilohms, and resistor 116 has a value of 10 kilohms, for a control signal pulse of 3 volts developed across resistor 116, the drain-source resistances $R_{DS}$ each will be about 45 ohms and the gate-drain resistances $R_{GD}$ each will be about 1000 ohms. Because of these relatively low resistances, little current flows to the coil 66 of filter F. The resistances $R_{DS}$ and $R_{GD}$ will be smaller with larger control signal pulses and slightly larger with smaller control signal pulses.

The silencing circuit herein described and illustrated offers the advantage of fast response, blocking of the intelligence bearing signals commencing with the noise-derived control signal pulses and terminating with termination of said same control signal pulses. The latter signals have sharp leading and trailing edges.

The silencing circuit herein described and illustrated has several advantages. For one thing it has fast response. Since the control signals are pulses with sharp leading and trailing edges, blocking of the intelligence-bearing signals occurs and terminates simultaneously with the leading and trailing edges of the control pulses. A further advantage is that the transistors $Q_2$ and $Q_3$ operate in push-pull. Hence noise generated by turning one of these transistors off or on is 180 degrees out of phase with and will be cancelled by the noise generated by corresponding operation of the other FET transistor. It also offers the advantage that conventional transistors may be used in place of the field effect types shown as $Q_2$ and $Q_3$. However use of other types of transistors may require certain modifications to achieve correct impedance matching. If conventional PNP transistors are used, the diodes CR1 and CR2 would be connected to the collectors and the signal output would be taken at the emitters. If NPN transistors are used, the diodes would be connected to the emitters and the output would be taken from the collectors.

It is to be appreciated that the pulse amplifier $Q_5$ functions similarly to a gating circuit since it produces an output control signal effective to turn on diodes CR1 and CR2 only in response to negative noise pulses. Accordingly it is contemplated that the circuit may be modified by replacing amplifier $Q_5$ with a pulse amplifier which amplifies both negative and positive pulses and adding a gating circuit, e.g., a diode gating circuit which includes a resistor, diode means for gating negative noise pulses from the pulse amplifier around or in shunt with the resistor, and diode means for gating positive pulses for the pulse amplifier through the resistor, with the result that a control signal voltage for the diodes CR1 and CR2 is developed across the resistor only in response to positive noise pulses. Still other circuits may be used for generating control signal voltages for the diodes CR1 and CR2 in response to negative or positive noise pulses.

It is to be understood that the invention is not limited in its application to the details of construction and arrangement of parts specifically described or illustrated, and that within the scope of the appended claims, it may be practiced otherwise than as specifically described or illustrated.

What is claimed is:

1. In a radio receiver comprising multi-stage circuit means providing a predetermined path for intelligence bearing signals and adapted to process said signals to extract the intelligence contained therein and produce an output according to the extracted intelligence, and means for applying intelligence bearing signals to said circuit means, a first silencing circuit constituting one of the stages of said circuit means and adapted to respond to noise-derived control signals and to prevent said signals processing by said circuit means, and a second circuit for deriving said control signals from noise signals appearing at the input to said first silencing circuit, said first silencing circuit comprising an input transformer having a primary coil and a secondary coil with said primary coil connected to a preceding stage of said circuit means so as to be energized by signals passed by said preceding stage, output means including first and second input terminals for coupling intelligence-bearing signals passed by said silencing circuit to a succeeding stage of said circuit means, a pair of field effect transistors having their gate electrodes connected to opposite ends of said secondary coil and their source electrodes connected to said input terminals so that said transistors operate in push-pull to pass said intelligence-bearing signals from said secondary coil to said output means, and a pair of diodes connected back to back between the drain electrodes of said transistors and polarized so as to be non-conducting with respect to said intelligence-bearing signals, said second circuit being connected to receive signals passed by said preceding stage and comprising means for amplifying noise signals passed by said preceding stage, means for producing control signals from said amplifier noise signals, and means for applying said control signals to said diodes so as to render said diodes conductive, whereby said transistors and diodes provide a low impedance current path shunting said output means so that the amplitude of said intelligence bearing signals appearing at said input terminals is insufficient to drive said succeeding stage.

2. A radio receiver as defined by claim 1 wherein said transistors are of the PNP type.

3. A radio receiver as defined by claim 1 wherein said preceding stage is a mixer.

4. A radio receiver as defined by claim 1 wherein said output means is a filter.

5. A radio receiver as defined by claim 1 wherein said second circuit comprises means for rectifying said amplified noise signals to obtain noise pulses, and further wherein said means for producing control signals is responsive to said noise pulses.

6. A radio receiver as defined by claim 5 wherein said means for producing control signals includes a circuit connected for passing noise pulses of one polarity and blocking noise pulses of opposite polarity, and further wherein said control signals are produced in response to noise pulses of said one polarity.

7. In a radio receiver comprising circuit means providing a predetermined signal path wherein received intelligence signals are procesed to extract the intelligence contained therein, means for applying received intelligence signals to said circuit means, and output means connected to said circuit means for producing an output according to the intelligence extracted from said intelligence signals, a first silencing circuit in said circuit means adapted to respond to noise derived control signals to substantially prevent said intelligence signals and noise signals from passing through said circuit means to said output means, and a second circuit for deriving said control signals from noise signals accompanying said received intelligence signals, said first silencing circuit being part of said signal path and comprising a pair of three-terminal semiconductor current control devices having corresponding first and second terminals thereof connected so as to provide push-pull operation with said intelligence signals passing from said first to said second terminals, the third terminals of said devices being connected to each other by means normally preventing current flow through said devices between said second and third terminals, said second circuit comprising means for detecting noise signals, means for producing control signals of predetermined polarity in response to said noise signals, and means for applying said control signals to said silencing circuit so as to establish a low resistance path between said third and said first and second terminals of each device in shunt with said predetermined signal path, whereby said circuit means is effectively prevented from passing intelligence signals and noise signals to said output means.

References Cited

UNITED STATES PATENTS 3,056,087 9/1962 Broadhead, Jr., et al. __ 325—478

ROBERT L. GRIFFIN, Primary Examiner

R. S. BELL, Assistant Examiner

U.S. Cl. X.R.

325—348